United States Patent [19]

O'Pray

[11] 4,447,813

[45] May 8, 1984

[54] PROGRAMMABLE BUS FOR THE CONTROL OF ELECTRONIC APPARATUS

[75] Inventor: Bruce L. O'Pray, New York, N.Y.

[73] Assignee: Control Resources Corporation, Hackensack, N.J.

[21] Appl. No.: 385,037

[22] Filed: Jun. 4, 1982

[51] Int. Cl.³ .............................................. H04Q 9/00
[52] U.S. Cl. .................................... 340/825.1; 370/85
[58] Field of Search .......... 340/825.1, 825.83, 825.52; 364/716; 370/67, 85; 371/68

[56] References Cited

U.S. PATENT DOCUMENTS

| | | | |
|---|---|---|---|
| 3,898,373 | 8/1975 | Walsh | 370/85 |
| 4,016,369 | 4/1977 | Pedersen | 340/825.52 |
| 4,117,317 | 9/1978 | Dooley, Jr. et al. | 371/68 |
| 4,253,087 | 2/1981 | Saal | 340/825.52 |
| 4,268,908 | 5/1981 | Logue et al. | 364/716 |
| 4,307,379 | 12/1981 | Wyland | 340/825.83 |

*Primary Examiner*—Donald J. Yusko
*Attorney, Agent, or Firm*—Kane, Dalsimer, Kane, Sullivan and Kurucz

[57] ABSTRACT

An improved bus architecture is provided wherein the bus line extends from a programmable control unit. A plurality of apparatus receiving slots extend along the bus adapted to receive apparatus modules to be connected to the bus. An enabling line extends from the control unit to each apparatus slot for interconnection with the apparatus to control access of the apparatus to the bus. The enabling lines are under control of the programmable control unit.

5 Claims, 6 Drawing Figures

PROGRAMMABLE BUS FOR THE CONTROL OF ELECTRONIC APPARATUS

BACKGROUND OF THE INVENTION

The present invention relates to bus architecture and in particular to a programmable bus control unit.

The well known benefits of bus architecture for electronic circuitry are that it minimizes the amount of wiring and signal paths required. This is accomplished by effecting the interconnection of a number of devices or components through the sharing of common signal paths.

In the traditional implementation of bus architecture each signal path is specifically defined within the bus. This definition comprises a signal name, electrical characteristics, timing, etc. Each signal path in the conventional bus performs the same function for each device that is connected to the bus. This necessitates adaptation of the bus signals in order to meet the requirements of each particular device thus requiring some interface circuitry.

In view of the above, it is the principal object of the present invention to provide an improved bus which significantly reduces the amount of bus interface circuitry to perform various functions.

A further object is to provide such a bus which may be used for analog or digital operation.

A still further object is to provide such a bus which may be implemented at a competitive cost in comparison with conventional buses.

Still further objects and advantages will be apparent from the following description.

SUMMARY OF THE INVENTION

The above and other beneficial objects and advantages are attained in accordance with the present invention by providing a bus with programmable bus control unit. The unit comprises at least one outbound unidirectional line, at least one inbound unidirectional line, a first plurality of bidirectional lines, a plurality of apparatus reception slots, and a SLOT ENABLE signal line for each slot. The slot enable signal line serves to control access to the bus by an apparatus present at a particular slot. At each slot the function of the bus lines may be redefined as required by said apparatus.

DETAILED DESCRIPTION OF THE PREFERRED EMBODIMENT

Figure 1:
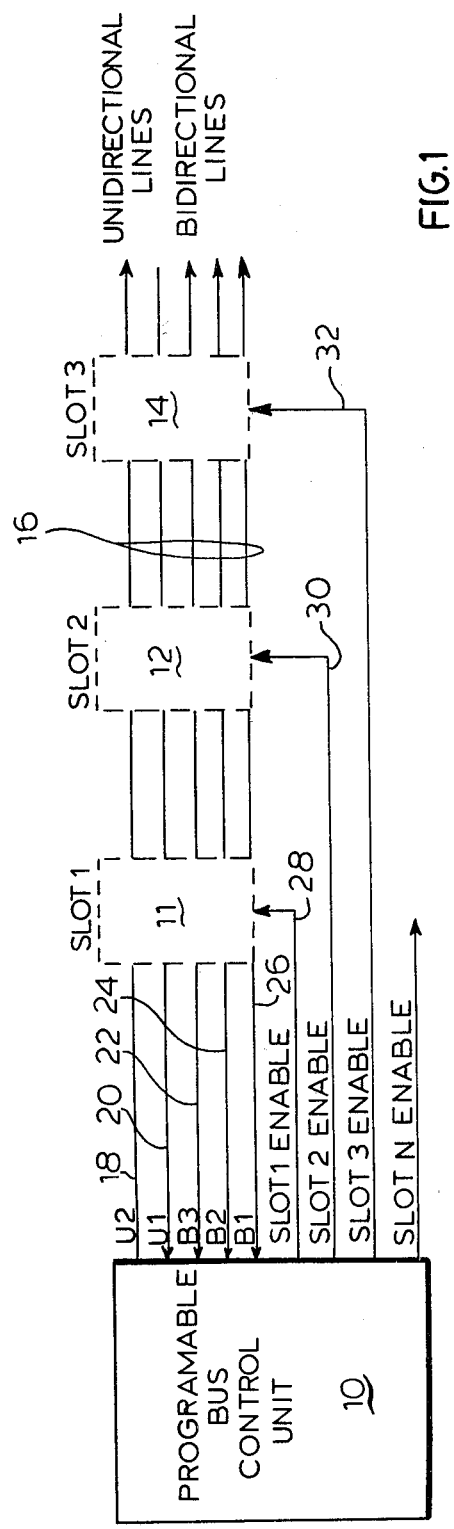
FIG. 1 is a block diagram of a simplified implementation of the present invention.

Reference is now made to the drawings and to FIG. 1 in particular wherein a programmable bus control unit (BCU) 10 in accordance with the present invention is shown for controlling the passage of information to or from a plurality of apparatus receiving slots 11, 12, 14 along a plurality of bus lines 16. The bus comprises two unidirectional lines, one line 18 emenates from the control unit 10 and the other line 20 goes to the control unit. The bus further comprises a plurality of bidirectional lines 22, 24, 26 which can pass information either to or from the control unit. The bus further comprises a line directed to each slot. Thus line 28 is directed to slot 10, line 30 is directed slot 12 and line 32 is directed to slot 14. The purpose of lines 28, 30 and 32 is to transmit a SLOT ENABLE signal to the respective slots 10, 12 and 14 to thereby control access to the bus by an apparatus present at the slot. The bus control unit may, for example, comprise a programmable IC chip, or dedicated microprocessor or receive its control signals from an external source.

Figure 2:
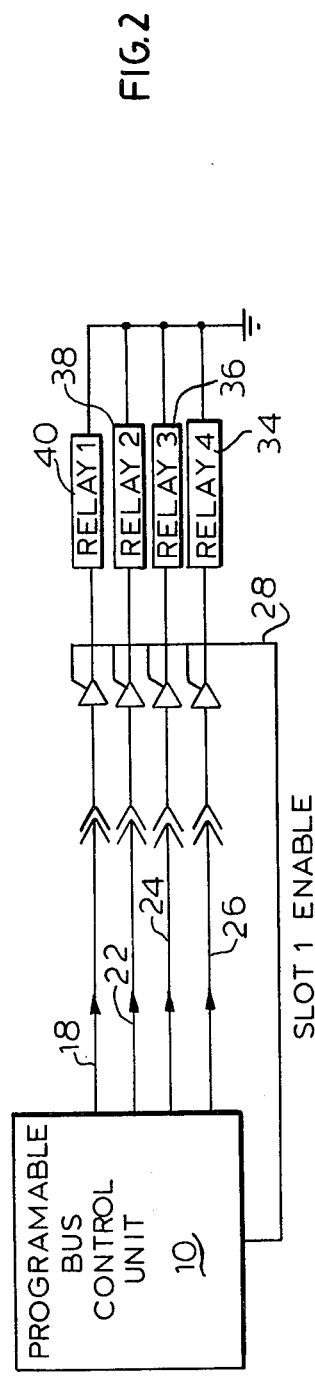
FIG. 2 is a block diagram depicting a control application utilizing the present invention.

In FIG. 2 a simple control application of the present invention is depicted. In this application the bidirectional lines 22, 24, 26 are designated outbound from the control unit 10 to control relays 34, 36, 38, 40 along with the outbound unidirectional line 18. The relays 34, 36, 38, 40 comprise at least a portion of the apparatus in slot 1. As shown, the relays may only be energized while the SLOT 1 ENABLE line 28 is in a true state. At other times the control signals to the relays are inhibited. It should be noted that in this configuration, when the SLOT 1 ENABLE line 28 is in its true state the bus can not be used to pass information to or from any other apparatus in another slot along the bus line.

Figure 3:
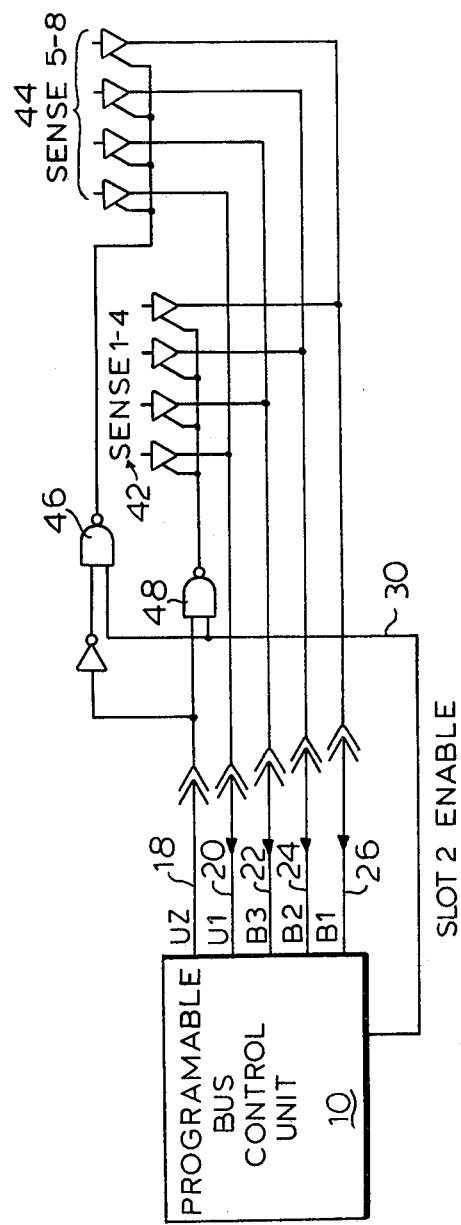
FIG. 3 is a block diagram of a simple sense application of the present invention.

In FIG. 3 the outbound line 18 is used to address one of two registers 42 and 44 in an apparatus in slot 2. The inbound line 20 along with the bidirectional lines 22, 24, 26 designated inbound, are then used to transfer information from the registers to the BCU. As shown the SLOT 2 ENABLE signal on line 30 is necessary to gate the address signal on line 18 through gates 46 and 48 to address register 42 or 44.

Figure 4:
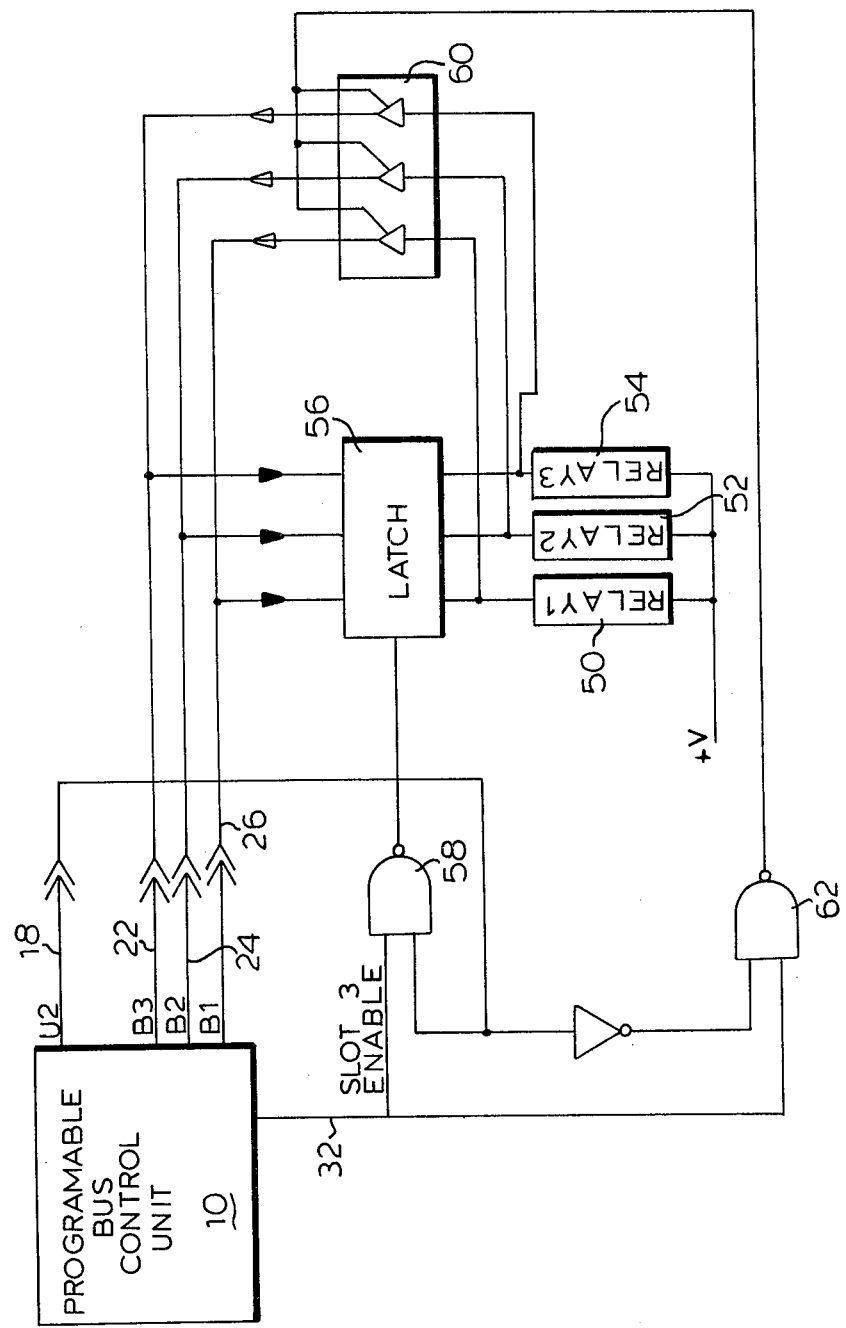
FIG. 4 is a block diagram of a more complex application of the present invention.

In FIG. 4 the outbound line 18 is used as a read/write control line and the bidirectional lines 22, 24, 26 are used as a bidirectional bus for an apparatus in slot 3 which includes relays 50, 52, 54 which may be latched in a particular state through latch 56. In this case the SLOT 3 ENABLE line 32 operates in cooperation with line 18 to control the latch 56 through gate 58 and the output of register 60 through gate 62. The relays will remain in their latched state while the control unit is passing information to other apparatus.

Figure 5:
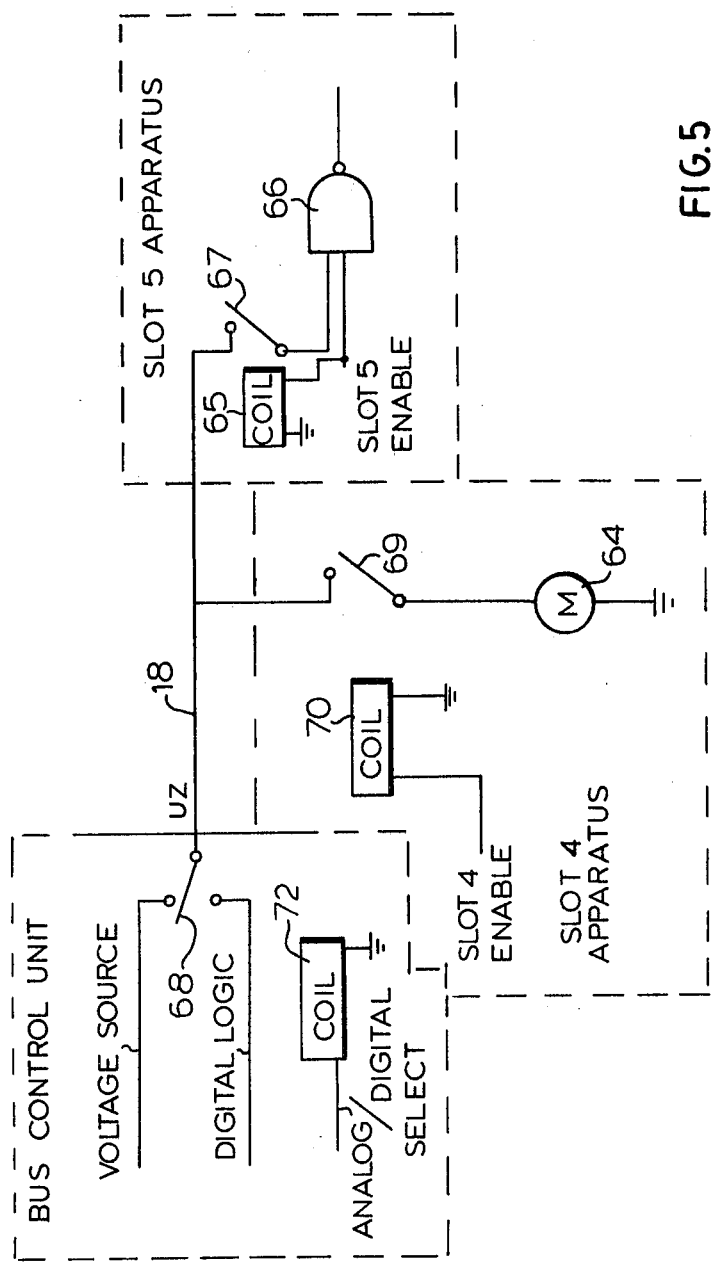
FIG. 5 is a circuit drawing depicting the bus line of the present invention used for digital and analog operation; and, FIG. 6 is a block diagram depicting an information transfer between apparatus connected to two slots of the bus.

In FIG. 5 a single bus line, unidirectional line 18, for example, is used for analog operation in an apparatus in slot 4 and digital operation in an apparatus in slot 5. When slot 4 is activated, relay coil 70 is energized, closing contacts 69, thereby connecting the analog meter 64 to the bus line 18. The apparatus in slot 4 includes an analog meter 64 that is to be used to indicate a voltage through the control unit 10. The apparatus in slot 5 uses the same line 18 as a digital control line through gate 66. When slot 5 is activated, relay coil 65 is energized closing contacts 67, thereby connecting the gate 66 to the bus line 18. A pair of relay contacts 68 in the control unit controlled by coil 72 which is activated under program control by the BCU determines whether line 18 will carry the analog or digital information when a particular slot is activated.

Figure 6:
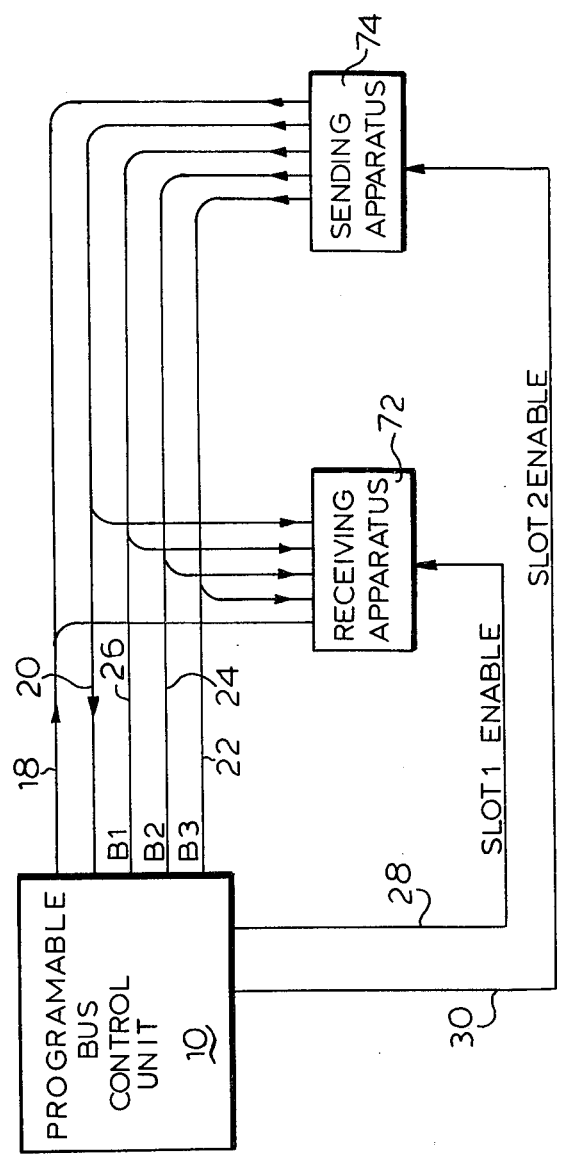

In FIG. 6 a receiving apparatus 72 such as for a telecommunications systems is provided in slot 1 and a transmitting apparatus 74 is provided in slot 2. Information between the two pieces of apparatus may be transferred by turning on the SLOT 1 ENABLE and SLOT 2 ENABLE at the same time using the unidirectional line 20 to "clock" the information between the apparatus.

Thus, in accordance with the above, the aforementioned objects are effectively attained. It should be apparent that in accordance with the present invention, the bus lines may be redefined as required by the apparatus connected thereto. Said redefinition may comprise a change in direction, function, timing or electrical levels.

Having thus described the invention, what is claimed is:

1. An improved bus architecture comprising: a bus formed of a plurality of lines; a programmable bus control unit connected to said bus lines; a plurality of slots along said bus line, each slot being adapted to receive an apparatus for connection with said bus line; and a plurality of slot enabling lines, each enabling line extending from said control unit to one of said slots whereby said enabling lines control access of said apparatus to said bus lines under direction of said control unit so that the function of said bus lines may be redefined as required by said apparatus.

2. The invention in accordance with claim 3 wherein said bus includes at least one unidirectional line outbound of said control unit.

3. The invention in accordance with claims 1 or 2 wherein said bus includes at least one unidirectional line inbound of said control unit.

4. The invention in accordance with claim 3 wherein said bus includes at least one bidirectional line.

5. The invention in accordance with claim 4 wherein said apparatus may utilize bus lines which operate in either an analog or digital mode.

* * * * *

UNITED STATES PATENT AND TRADEMARK OFFICE
CERTIFICATE OF CORRECTION

PATENT NO. : 4,447,813
DATED : May 8, 1984
INVENTOR(S) : Bruce L. O'Pray

It is certified that error appears in the above-identified patent and that said Letters Patent is hereby corrected as shown below:

In Claim 2, line 8, after "claim" change "3" to --1--.

Signed and Sealed this

Fifteenth Day of January 1985

[SEAL]

Attest:

GERALD J. MOSSINGHOFF

*Attesting Officer*  *Commissioner of Patents and Trademarks*